United States Patent [19]

Fitzpatrick et al.

[11] Patent Number: 6,128,708
[45] Date of Patent: Oct. 3, 2000

[54] METHOD FOR TESTING AND MITIGATING SHARED MEMORY CONTENTION IN MULTI-PROCESSOR SYSTEMS

[76] Inventors: Gordon James Fitzpatrick, 10 Borden Street, Nepean, Ontario, Canada, K2H 8C8; Tadeusz Drwiega, 64 McIntosh Place, Kanata, Ontario, Canada, K2L 2N8; Sundaram Chinthamani, No. 806, 91 Valleystream Drive, Nepean, Ontario, Canada

[21] Appl. No.: 08/998,218

[22] Filed: Dec. 24, 1997

[51] Int. Cl.[7] .............................. G06F 12/00; G06F 7/00; G06F 15/167

[52] U.S. Cl. ...................... 711/147; 711/148; 711/153; 711/154; 711/152; 709/213; 709/214; 709/215; 709/216; 707/7; 707/3; 707/4; 707/5

[58] Field of Search ..................... 711/147, 153, 711/152, 148, 154; 709/213, 214, 215, 216; 707/7, 8, 3, 4, 5

[56] References Cited

PUBLICATIONS

T. Drwiega, Shared Memory Contention and its Impact on Multi–Processor Call Control Throughput.

*Primary Examiner*—John W. Cabeca
*Assistant Examiner*—Kimberly McLean
*Attorney, Agent, or Firm*—Chupa & Alberti, P.C.

[57] ABSTRACT

The method of the present invention provides a procedure for testing shared-memory multi-processor (SMMP) performance by formulating and modifying a given memory contention matrix (MCM), which is generated by collecting traces of memory addresses accessed by so-called subcalls in an SMMPCC. A subcall pair contending for at least one shared memory access address enters a "1" at the respective matrix element. For subcall pairs not sharing any memory address a "Ø" is entered.

6 Claims, 3 Drawing Sheets

METHOD FOR TESTING AND MITIGATING SHARED MEMORY CONTENTION IN MULTI-PROCESSOR SYSTEMS

BACKGROUND OF THE INVENTION

1. Field of the Invention

The present invention relates to shared-memory multi-processor data processing systems in general, and in particular to shared-memory multi-processor call control (SMMPCC) telephone switching systems. The method of the present invention provides a procedure tor testing shared-memory multi-processor (SMMP) performance by formulating and modifying a given memory contention matrix (MCM), which is generated by collecting traces of memory addresses accessed by so-called subcalls in an SMMPCC. A subcall pair contending for at least one shared memory access address enters a "1" at the respective matrix element. For subcall pairs not sharing any memory address a "Ø" is entered.

2. Related Art

A shared-memory multi-processor call control (SMMPCC) system executes several transactions in parallel. Those transactions are parts of the call control and they will be hereafter referred to as subcalls. Executing subcalls may need to access the same address(es) in the shared memory. One of the major problems in a multiprocessor system is in preventing data access collisions due to two or more processors accessing the same data at the same time. To avoid this problem, solutions such as blocking and rollback have been devised, which affect processing power adversely. The problem is exacerbated when there is an increase in the number of multi-processors. In these events, it is desirable to address the issue of shared-memory access and contention which often results from scaling up the number of processors.

An access request for a locked address is blocked, unless it is the requesting subcall who locked the address. A subcall whose request is blocked is immediately rolled back to the state before the execution and restarted later. All addresses locked by the subcall prior to its rollback are released and their contents are restored.

The processor time used by rolled back subcalls does not result in any useful work done and therefore decreases its processing power. The more subcalls are rolled back the less processing time is available for doing useful work. The total real time used by rolled back subcalls, and consequently the processing power of a SMMPCC depends on factors such as: number of processors, level of the load offered to the core, average real time used by rollbacks, and level of potential memory contention in the offered load of subcalls.

SUMMARY OF THE INVENTION

The present invention endeavours to mitigate the problem of memory contention and minimize memory address blocking and, therefore, reduce rollback.

The present computer implemented method produces a unique test by partitioning subcalls into groups, which partitioning varies from system to system. Data access behaviour of a system is measured and a data access contention matrix is formulated before the method of the present invention can be implemented. That is, the software of an SMMPCC must be first characterized before it can be improved.

Accordingly, the method of testing shared-memory contention in a shared-memory multi-processor (SMMP) system includes the steps of:

(a) generating an initial memory access contention matrix from shared memory access records in said SMMP;

(b) sorting the initial contention matrix into a sorted contention matrix by permuting rows and columns in the initial contention matrix;

(c) compacting the sorted contention matrix into a compacted contention matrix by more tightly grouping contending elements of the sorted contention matrix; and (d) predicting capacity of said SMMP using said compacted contention matrix.

Another aspect of the present invention provides a method for improving call throughput in a shared-memory multi-processor call control (SMMPCC) telephone switching system, including the steps of:

(a) measuring memory access of subcalls in said SMMPCC;

(b) identifying subcall pairs sharing at least one shared-memory address for common access;

(c) sorting said subcall pairs into memory access contention groups; and (d) compacting the contention groups to form compacted groups wherein most subcall pairs in a compacted group contend with each other for shared-memory access.

It should be noted that the words "data" and "memory" should be regarded as interchangeable throughout.

BRIEF DESCRIPTION OF THE DRAWINGS

The preferred embodiment of the present invention will now be described in conjunction with the annexed drawing figures, in which.

DETAILED DESCRIPTION OF THE PREFERRED EMBODIMENTS

Figure 1:
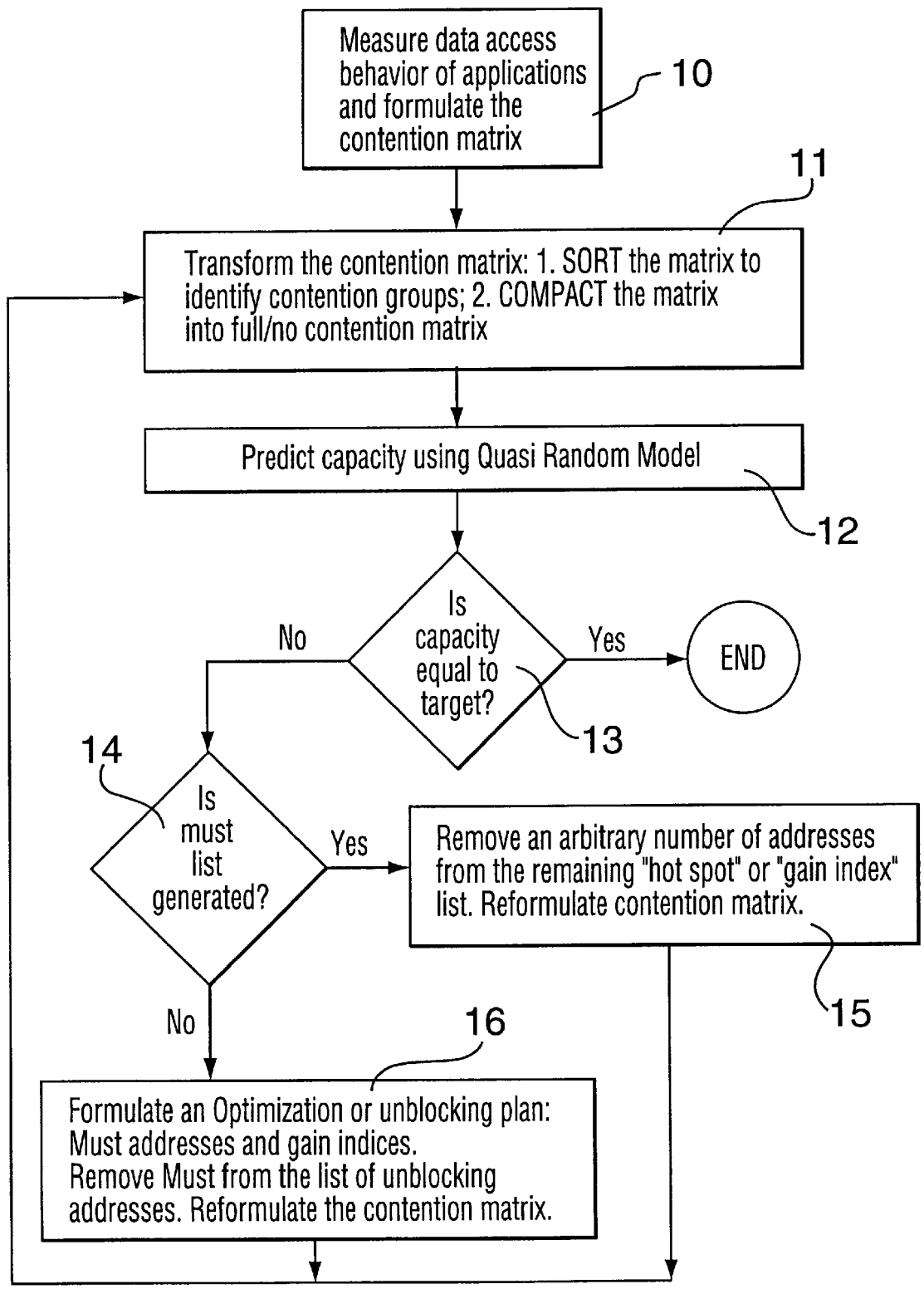
FIG. 1 is a flow-chart summarizing the method of mitigating memory contention according to the present invention.

Referring to FIG. 1 of the drawings, the method of the present invention begins with the existing behaviour of the SMMPCC system as formulated in the initial contention matrix 10, which initial number (IN) is first sorted into a sorted matrix (SM) and then compacted into a compacted matrix (CM) 11. In the next step 12 the optional, but preferred, computational procedure of predicting throughput capacity of the SMMPCC with the contention matrix group of subcalls as per the CM is performed. If the throughput capacity is satisfactory 13, no iteration is necessary. If it is not, however, a generated "must list" (ML) 14 is used to reformulate the CM 15. If an ML has not been generated, one is generated and its contents are removed from the list of unblocking memory addresses and the CM is reformulated 16. The "must list" is the list of those contending shared-memory addresses which must be made contention-free as a necessary condition to obtaining a desired processing power from the SMMPCC. The must list may be determined by the following procedure. Given a target processing power N-times the processing power of a single processing element, then any shared-memory address cannot be accessed by more than $$\frac{1}{N}$$

times the subcall mix, as shown in the paper by T. Drwiega (see below, page 9, line 13). A subcall is a task which can run to completion without further message interactions or waiting. A subcall mix is a weighted combination of subcall call type intensities and the length of memory access time of associated subcalls. In the event that a memory line contains multiple contention addresses, the above fraction $$\frac{1}{N}$$

must be modified to $$\left(1 - \sqrt[R]{1 - \frac{1}{N}}\right),$$

where R is the number of contention addresses per memory line. The number of addresses in the must list is then used to generate the must list itself by taking the top sequence of addresses equal to that number from the "hot spot list" of addresses, which is simply the ordered list of addresses by intensity per unit time of memory accesses for the given SMMPCC (i.e. its software and subcall mix weight).

To summarize, given that useful processing power N is required, a single memory line (say, the 32 byte location locked upon reference until the subcall commits) will become a bottleneck if accessed by a maximum of 1/N intensity by the subcall mix running, and will allow no more than one processing element's worth of load to be performed, no matter how many actual processing elements are active in the system. This implies that the subcall mix can get less than "N" useful processing power. Therefore, to attain a given target scaleable processing power, there is a threshold access intensity which cannot be exceeded to any address in shared-memory. When potential contention addresses are sorted by intensity of memory access for a given subcall mix, all addresses above this threshold form the "must list" of contention addresses which will prevent the target capacity being attained if they are not modified. Every address of intensity 1/N "must" be modified to prevent any memory line intensity from becoming 1/N. Assuming a worst case of one memory line where each address is a contention address, the lower threshold may be required, as shown, where independent probability of address occurrence is assumed. However, experience has shown that this worst-case assumption is quite conservative when specifying a threshold intensity for the "must list" of addresses to modify. This "must list" of addresses with access intensity above 1/N provides an unambiguous starting point to the otherwise Herculean task of modifying software for scaleable SMMP processing power. Since this list is only a necessary condition for reaching the required level of scaleability, the question must be asked: "What should the priority of further software modification be?"

The "hot spot" strategy prioritizes addresses by access intensity for a given subcall mix. However, after observing systematic correlations in memory accesses, an alternative heuristic "gain index" is considered. The "gain index" assumes a grouping of congestion to provides a higher index to addresses whose removal is more likely to result in subcall pairs becoming contention free. The following is an example of the "gain index" evaluation for an illustrative contention matrix (where A, B, C, etc. are contention addresses):

EXAMPLE 3×3 CONTENTION MATRIX

|  | SUBCALL 1 | SUBCALL 2 | SUBCALL 3 |
|---|---|---|---|
| SUBCALL 1 (50% call mix) | A B C D E L | A C | C |
| SUBCALL 2 (30% call mix) | A C | A C G H K | C H K |
| SUBCALL 3 (20% Call mix) | C | C H K | B C F H I J K |

The gain index is computed as:

gain index (address)=sum over subcall pairs accessing this address of:

$$\frac{\text{intensity of subcall pair}}{\text{number of contention addresses to unblock subcall pair}}$$

For example, the gain index GI(A) for "A" in the above matrix would be $$GI(A) = 0.5 \times \frac{0.5}{6} + 0.3 \times \frac{0.3}{5} + 2 \times 0.5 \times \frac{0.3}{2} = \simeq 0.21$$

while for 6ll(F) it is $$GI(F) \simeq 0.2 \times \frac{0.2}{7} = 0.006$$

Both the "hot spot" strategy and "gain index" strategy start with a "must list" for a given target processing capacity, then produce preferred removal of addresses. The "hot spot" strategy leads the removal by access intensity; the "gain index" strategy computes the gain indexes leads to removal of some members of addresses from the top of the list, and then repeats the procedure iteratively. The "gain index" approach is, therefore, more conserving of the existing software of the SMMPCC.

The step of capacity prediction 12 may use the following theoretical quasi random model devised by one of the co-inventors. A paper on this model was given at the 15th International Teletraffic Congress, Washington, U.S.A. in 1997 by T. Drwiega entitled "Shared Memory Contention and its Impact on Multi-Processor Call Control Throughput", which is incorporated herein by reference.

Processing a call is performed in stages, called subcalls, which correspond to the phases of the call, such as off-hook, digits, supervision, release, etc. Subcall execution may require accessing some data from the shared memory. Subcalls, which have to access the shared memory, can block, or be blocked on memory access when they are executing concurrently in different processors.

In order to be able to model memory contention, accesses of shared memory by subcalls have been studied. The following key characteristics of memory contention were found:

1. There is a fraction of subcalls which do not access the shared memory.

2. Shared memory addresses accessed by two different subcalls are accessed in the same order by both subcalls. For example, if one subcall accesses addresses A, C, E, K, U, V, then the other subcall accesses B, C, D, E, O, U, Y, Z.
3. Subcalls which access shared memory addresses do not necessarily have common addresses with all other subcalls accessing shared memory. Many pairs of subcalls access disjoint sets of addresses. Moreover, depending on the call mix, subcalls from groups, which we call contention groups, such that members of a group access common shared memory addresses, and subcalls from different groups do not contend, or very little contend, for shared memory addresses.

The first observation means that a part of the load of subcalls offered to the SMMPCC will never block on memory access. The second observation means that if two subcalls concurrently try to access the same addressees in the shared memory, the subcall that accesses the first common address cannot be blocked by the other.

Based on the observations the important parameters characterizing memory contention between subcalls are:

1) the fraction of subcalls which do not access shared memory, and therefore never block,
2) the number of contention groups and their sizes,
3) for each pair of subcalls, the time into the subcalls execution when the first common address is accessed.

The first two parameters are indicators of potential for memory contention in the call processing software, for a given mix of subcalls, which we call potential blocking.

Potential blocking is independent of the number of processors and of the intensity of the traffic offered to SMMPCC.

The above parameters are an input of the model for studying the impact of memory contention on SMMPCC throughput.

Figure 2:
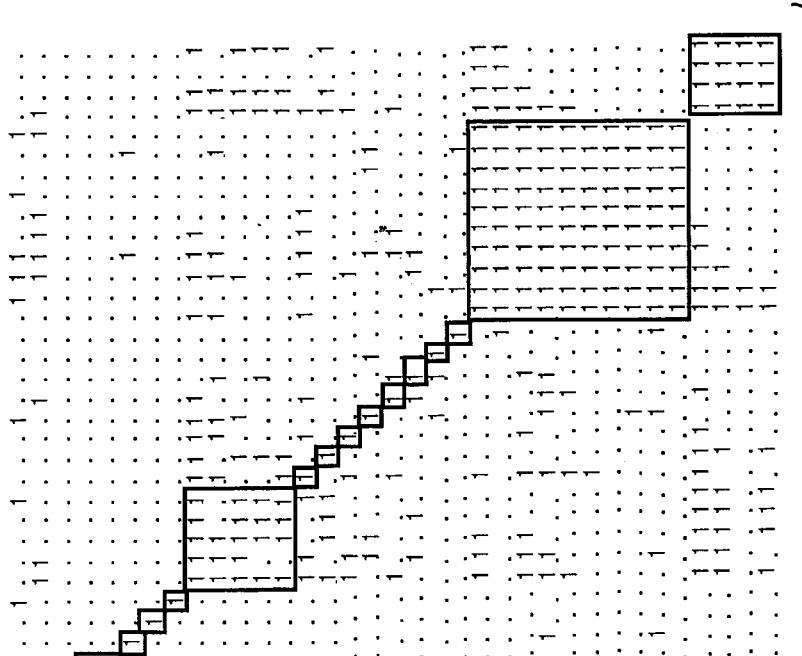
FIG. 2 is an illustration of the sorting procedure according to the present invention.
Figure 2:
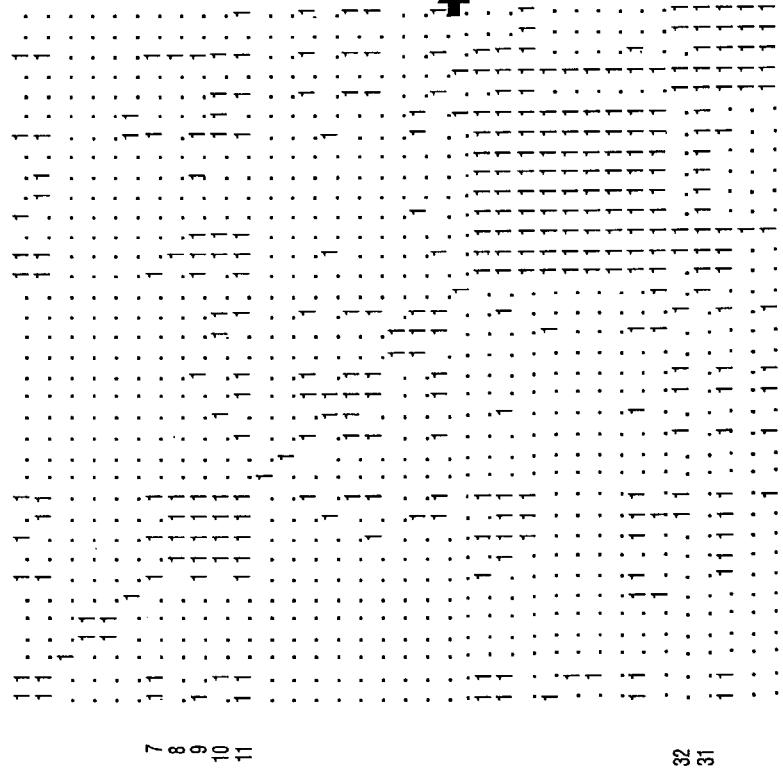

With reference to FIG. 2, the steps of sorting of the initial (raw) contention matrix into the sorted contention matrix will be described.

To reduce complexity, the method proceeds in a hierarchical fashion. First, call types are permuted so that all the interacting call types are placed together in the subcall contention matrix. All the interacting call types together are called a call type group. Next, subcalls within each interacting call type group are permuted so that all the interacting subcalls are placed together. When permuting subcalls, possible interaction between call types in different call type groups is ignored. Proceeding in such a hierarchical fashion, time complexity of the algorithm is significantly reduced from $o(n^3)$ (when all interacting subcall pairs are considered) to $o(k^2)+o(n^2/k*\log(n.k))$, where n is the no. of subcalls and k is the number of call types. For sorting a 400 by 400 matrix (the largest matrix encountered so far), this reduces the running time to less than 5 minutes from 5 hours on a HP 9000/712/60 Unix machine.

Thus, given a set of call types (K—number of call types) and a set of subcalls (N—number of subcalls), the steps are:

1. Find the interacting call types. Two call types interact, if the portion of the contention matrix corresponding to these call types has at least 30% of the entries filled.
2. Partition the set of call types into disjoint subsets that: (a) For every call type in a subset, there exists at least one other call type, with which it interacts, (b) any two call types in two different subsets do not interact with each other; (c) every call type is exactly in one subset. Each such disjoint subset is henceforth called an interacting call type group. At this point, all the possible interaction between subcalls in two different interacting call type groups is ignored.
3. Partition the subcalls in each interacting call type group into disjoint subsets just the same way as we partitioned call types) of subcalls. Two subcalls interact with each other, if there is an entry in the contention matrix; at this point, each subset of subcalls within each interacting call type group is a contention group.
4. Re-arrange the subcalls within each contention group in the decreasing order of number of contention entries it has with the rest of the members in the group.
5. Split those contention groups which have less than 80% of entries filled into smaller contention groups. If the contention group has less than 80% of entries filled, then, the members from the end of the group are removed (subcalls having least number of contention entries with the rest of the members in the group) until a contention group which has 80% of the entries filled is obtained; finally, the same procedure is repeated to the group containing the left over members in the bottom.

In the above procedure, there are three key parameters: (i) Two call types interact, if the rectangular matrix formed by their subcalls contain at least 30% of the entries; this criterion is used in determining the interaction between two call types in steps 1 and 2, above. (ii) Each call type should interact with at least one other call type to be in a call type group; this criterion is used in forming the call type groups in step 2. (iii) Density of each contention group should be at least 80%; this criterion is used in splitting the sparse, contention groups in Step 5.

The result of the sorting procedure is shown in FIG. 2 on the right, where the diagonal boxes delineate contention groups with at least 80% of the entries filled.

Figure 3:
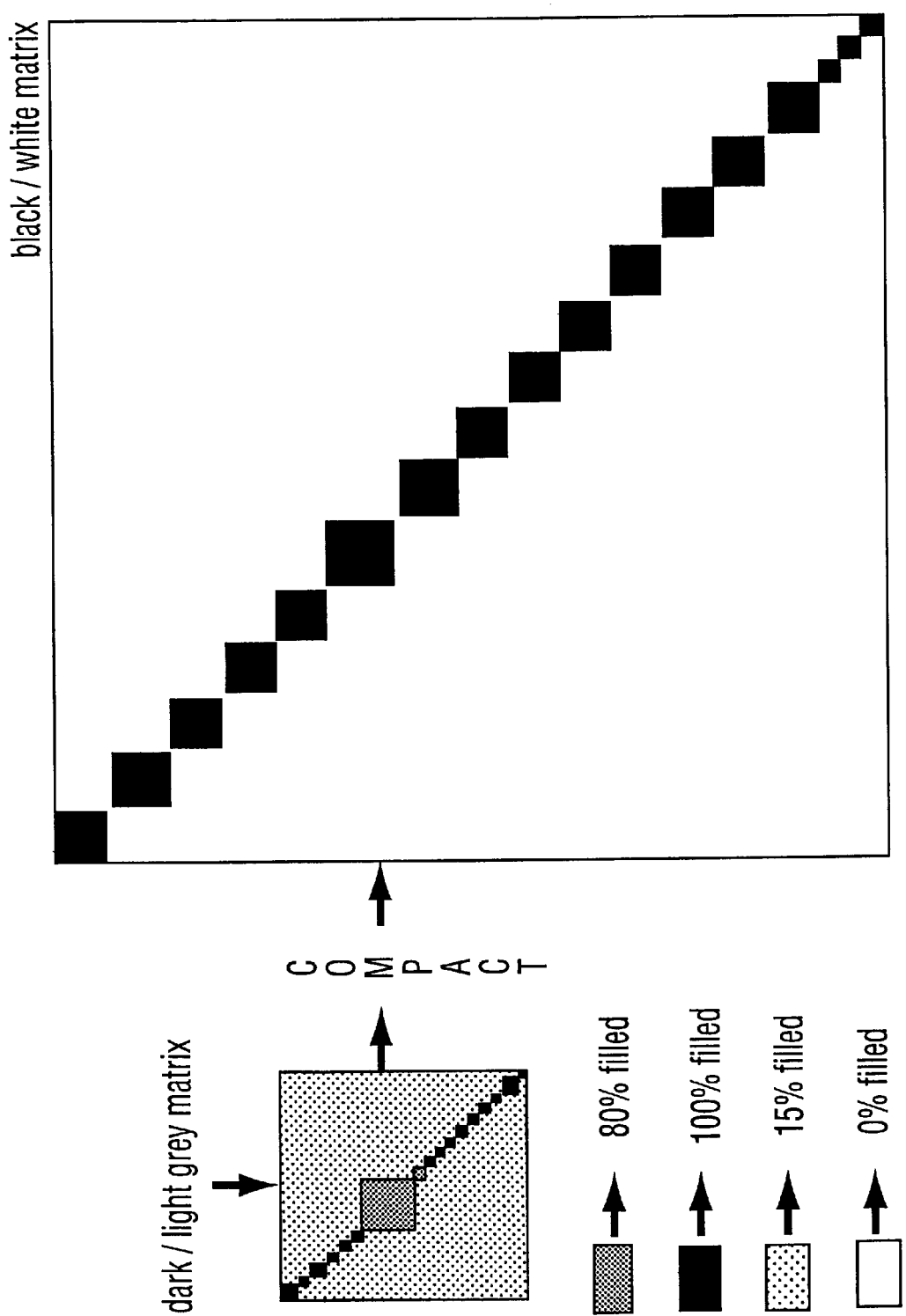
FIG. 3 is an illustration of the compacting procedure according to the present invention.

Having obtained the sorted contention matrix, we now turn to FIG. 3 and the step of compacting the sorted matrix into the compacted matrix. At the end of the sorting step, all the contention groups have been identified. These contention groups may not have all pairs contending. In other words, there may be holes inside the groups. Also, there may be contention entries present outside the contention groups. First the compacting fills the holes inside the contention groups from the contention entries present outside the groups. This will increase the contention inside the groups. Then, it adjusts the call mix weights so that all the contention groups could be treated as if they were fully blocking (that is, every subcall inside the group contends with every other subcall in the group) and independent (that is, there are no entries present outside the contention groups). That is, for each row in the contention matrix, either call mix weight is reduced if there are no holes that cannot be filled, or, the call mix weight is increased if there are entries outside the contention group that cannot be removed. This operation is performed so that the total potential blocking (sum of products of call mix weight of subcalls for each of the entries present in a contention matrix) is conserved. The weight adjustment is done iteratively until the total potential blocking in the transformed matrix is within a few percent (less than 5%) of the total potential blocking in the empirical contention matrix.

In the following detailed description of the compacting step, the term grey/light grey matrix and black/white matrix are used. The first term means a matrix in which there are contention entries (i.e. "1") present outside the contention groups, which is usual in a sorted matrix. The second term means a matrix wherein all the subcalls contend with each other and wherein no two subcalls in two different contention groups contend with each other. The capacity prediction mentioned above requires a black/white matrix.

The object of the compacting procedure is to convert the stored dark/light grey matrix into a complete black/white matrix while conserving the total potential blocking in the matrix. The total potential blocking in the matrix can be computed as the sum of products of call mix weights of subcalls i and j for every ijth entry present in the matrix. The total potential blocking in the matrix is a prime indicator of the capacity present in the matrix. Therefore, it is essential that this transformation process conserves the total potential blocking in the matrix.

For the purpose of describing the compacting procedure, we adopt the following notation: The contention matrix C is of size (N×N). i,j represent the row and column indices of the matrix. Both i and j range from 1 to N. There are K contention groups. The contention groups are indexed by k. k ranges from 1 to K. The starting row of contention group k is denoted by $U_k$. The ending row of contention group k is denoted by $L_k$. The entry in the contention matrix corresponding to ith row and jth column is denoted as $C_{ij}$. $C_{ij}=1$, if the entry is present and 0 otherwise. Call mix weight of ith subcall is denoted as $W_i$. A pseudo code for the compacting procedure is given below.

threshold–0.0
while (total blocking of the transformed matrix is within 5% of the total potential blocking of the empirical matrix)
  For contention group k=1 to K do
    for row i=$L_k$ to $U_k$ do
      Exchange any hole inside the group in ith row with a entry outside the group along ith row.
      calculate the sum of call mix weights of all subcalls (denoted by Sum_row) corresponding to those columns j where the entry $C_{ij}=1$.
      calculate the sum of call mix weights of all subcalls (denoted by Sum_group_ corresponding to those columns j (j being inside the group) where the entry $C_{ij}=1$.
      Adjust the call mix weight $W_i$ as follows:

$$W_i = W_i + \text{threshold} * \frac{W_i * \text{sum\_row}}{\text{sum\_group}}$$

end (of the inner for loop)
  end (of the outer for loop)
  threshold=threshold+0.01
end(of the outer while loop)

In FIG. 1, the example matrix illustrates the application of the compacting procedure. In this example, the matrix on the left side is the empirical sorted contention matrix and the matrix on the right side is the transformed compacted matrix. Note that the matrix on the left side is divided into dark grey and light grey regions. In the dark grey regions, 80% of the entries are filled. In the light grey regions, 15% of the entries are filled. Dark grey regions correspond to contention groups. The objective of the compacting procedure is to convert dark grey regions into complete dark region (100% of the entries filled) and eliminate light grey region while conserving the total potential blocking. Note that the transformed matrix appears much bigger in size as the modified call mix weights of each of the contention groups are bigger than their original call mix weights in the empirical matrix. But, the product of call mix weights of subcalls corresponding to contention entries (that is, total potential blocking) in both the matrices are equal.

What is claimed is:

1. The method of testing shared-memory contention in a shared-memory multi-processor (SMMP) system includes the steps of:

(a) generating an initial memory access contention matrix from shared memory access records in said SMMP;

(b) sorting the initial contention matrix into a sorted contention matrix by permuting rows and columns in the initial contention matrix;

(c) compacting the sorted contention matrix into a compacted contention matrix by more tightly grouping contending elements of the sorted contention matrix; and (d) predicting capacity of said SMMP using said compacted contention matrix.

2. The method of testing shared-memory contention in a shared-memory multi-processor (SMMP) system as defined in claim 1 to improve call throughput in a shared-memory multi-processor call control (SMMPCC) data switching system, further including the steps of:

(a) measuring memory access of processing phases (subcalls) of a call in said SMMPCC;

(b) identifying subcall pairs sharing at least one shared-memory address for common access;

(c) sorting said subcall pairs into memory access contention groups; and (d) compacting the contention groups to form compacted groups wherein most subcall pairs in a compacted group contend with each other for shared-memory access.

3. The method of claim 2, wherein step (c) further comprises the step of rearranging the subcalls within each contention group in a decreasing order of number of contentions within the contention group.

4. The method of claim 3, wherein step (d) further comprises the step of forming compacted groups wherein substantially all subcall pairs within a compacted group contend with each other for shared-memory access.

5. The method of claim 4, wherein substantially all subcall pairs within every compacted group contend with each other.

6. The method of claim 5, wherein there are only compacted groups in the contention matrix.

* * * * *

UNITED STATES PATENT AND TRADEMARK OFFICE
CERTIFICATE OF CORRECTION

PATENT NO. : 6,128,708
DATED : October 3, 2000
INVENTOR(S) : Fitzpatrick et al.

It is certified that error appears in the above-identified patent and that said Letters Patent is hereby corrected as shown below:

<u>Title page,</u>
Below item [76] Inventors, insert the following:

-- [73 Assignee: Nortel Networks Corporation, Montreal (CA) --.

Signed and Sealed this

Fourteenth Day of May, 2002

*Attest:*

JAMES E. ROGAN
*Attesting Officer*   *Director of the United States Patent and Trademark Office*